United States Patent [19]
Higashi et al.

[11] Patent Number: 5,977,004
[45] Date of Patent: Nov. 2, 1999

[54] POWDER OF TITANIUM COMPOUNDS

[75] Inventors: Kenji Higashi, Itami; Hironori Fujita, Amagasaki, both of Japan

[73] Assignee: Kubota Corporation, Osaka, Japan

[21] Appl. No.: 08/723,000

[22] Filed: Sep. 30, 1996

[51] Int. Cl.$^6$ .................................................. C04B 35/46
[52] U.S. Cl. ......................... 501/135; 501/136; 501/137; 423/598
[58] Field of Search .................................. 501/135, 136, 501/137, 95; 423/598, 608

[56] References Cited

U.S. PATENT DOCUMENTS

| | | | |
|---|---|---|---|
| 4,002,592 | 1/1977 | Baskin | 423/600 |
| 5,383,963 | 1/1995 | Kobayashi et al. | 106/36 |

FOREIGN PATENT DOCUMENTS

| | | |
|---|---|---|
| 615226 | 6/1935 | Germany . |
| A-55-113623 | 9/1980 | Japan . |
| A-57-88030 | 6/1982 | Japan . |
| A-61-191599 | 8/1986 | Japan . |
| A-62-21799 | 1/1987 | Japan . |
| A-2-164800 | 6/1990 | Japan . |
| A-3-16917 | 1/1991 | Japan . |
| 408053553 | 2/1996 | Japan . |

OTHER PUBLICATIONS

Chemical Abstracts, Abstract No. 83991a, vol. 97, No. 10, 1982, p. 792.

"Gmelins Handbuch der Anorganischen Chemie", Verlag Chemie, GMBH, Weinheim/Bergstrausse, System–Nummer 41, 1951, p. 432, Paragraph 1.

Database WPI, Section Ch, Week 8640, Derwent Publications Ltd., London, GB, Class E32, AN 86–262654, JP61–191–599A; August 26, 1986, (Abstract).

Database WPI, Section Ch, Week 8640, Derwent Publications Ltd., London, GB, Class E32, AN 86–262654, JP61–191–599A; Aug. 26, 1986, (Abstract).

*Primary Examiner*—Paul Marcantoni
*Attorney, Agent, or Firm*—Armstrong,Westerman, Hattori,McLeland & Naughton

[57] ABSTRACT

A particle of titanium compounds is in the form of a fine agglomerate comprising crystals of an alkaline-earth metal titanate represented by $RTiO_3$ wherein R is an alkaline-earth metal and crystals of an alkali metal titanate represented by $M_2Ti_nO_{2n+1}$ wherein M is an alkali metal and n is an integer of 2 to 6, or these two kinds of crystals and crystals of titanium dioxide ($TiO_2$), the two or three kinds of crystals being mingled together. A powder composed of such particles is produced by preparing a mixture from RO wherein R is an alkaline-earth metal or an alkaline-earth metal compound becoming RO when heated, $M_2O$ wherein M is an alkali metal or an alkali metal compound becoming $M_2O$ when heated, and $TiO_2$ or a titanium compound becoming $TiO_2$ when heated, in a ratio so that $Z \geq X+mY$ wherein Z is the number of moles of $TiO_2$, X is the number of moles of RO, Y is the number of moles of $M_2O$, Z, X and Y are each a positive number, and m is 6 when $Z>X+mY$ or m is 2 to 6 when $X=X+mY$, and heat-treating the mixture at a temperature of 700 to 1300° C. The powder is mixed with at least a binder resin, followed by molding to prepare a friction material.

8 Claims, 2 Drawing Sheets

POWDER OF TITANIUM COMPOUNDS

FIELD OF THE INVENTION

The present invention relates to a powder of titanium compounds, i.e., a powder comprising an alkaline-earth metal titanate and an alkali metal titanate, and more particularly to such a titanium compound powder which is suitable as the base of friction materials for brake linings, disk pads, clutch facings, etc. for use in the brake devices of motor vehicles, railroad cars, aircraft, industrial machines and the like.

BACKGROUND OF THE INVENTION

Friction materials for brake devices are produced by dispersion a base substance in a resin (such as a phenolic resin or epoxy resin) serving as a binder, incorporating a friction-wear adjusting agent (such as barium sulfate) into the dispersion when so required, and molding the resulting composition with heating and application of pressure.

Chrysotile asbestos fibers have been used as the base substance, whereas with an increase in the temperature of the friction surface, the asbestos-base friction material becomes markedly worn and damaged and is susceptible to a fading phenomenon involving a rapid decrease in the coefficient of friction. Further asbestos fibers are said to have the problem of being carcinogenic.

Accordingly, efforts have been directed to the development of substitutes for asbestos fibers.

Useful as base substances are, for example, alkali metal titanate fibers represented by $M_2Ti_nO_{2n+1}$ wherein M is an alkali metal such as K, Na, Li or Rb, and n is an integer of 2 to 8 (as disclosed, for example, in JP-A-191599/1986). Typical of such fibers is potassium hexatitanate ($K_2Ti_6O_{13}$).

Alkali metal titanate fibers are synthetic inorganic compounds having a layered crystal structure (when n is, for example, 2, 3 or 4) or tunnel-type crystal structure (when n is 6 or 8), and are materials outstanding in strength, heat resistance and wear resistance and having a suitable hardness as friction materials. Such alkali metal titanates are prepared, for example, by the melting process, i.e., melting a mixture of titanium dioxide and an alkali metal carbonate (about 2 in $TiO_2/M_2O$ molar ratio) with heating and cooling the melt to form an alkali metal dititanate ($M_2Ti_2O_5$), followed by a treatment for dissolving out alkali metal ions to adjust the chemical composition and by a heat treatment to alter the crystal structure.

Friction materials prepared with use of alkali metal titanate fibers as the base substance are superior in friction-wear characteristics to the conventional friction material wherein asbestos fibers are used, but it is desired to further improve these materials in anti-fading characteristics and coefficient of friction.

It is proposed to use potassium titanate fibers and alumina-silica fibers in combination in order to give improved anti-fading characteristics and other properties, whereas the alumina-silica fibers are as hard as about 7 in Moh's hardness and undesirable to use since the friction material then obtained has excessive counterpart abrasive properties due to the combination.

Alkaline-earth metal titanates represented by $RTiO_3$ wherein R is an alkaline-earth metal such as Ca, Ba, Sr or Mg are available as titanium compounds which are excellent in strength, heat resistance, heat-insulating properties, wear resistance and other properties like alkali metal titanates. These titanates are synthetic inorganic compounds having a crystal structure of the perovskite type, and are prepared, for example, by mixing a barium compound powder with acicular particles of hydrous titanium dioxide and heating the mixture (JP-A-88030/1982), by reacting a solution containing a hydrated potassium titanate powder or titanium dioxide hydrate, and bivalent metal ions in a closed container or under a hydrothermal condition (JP-A-113623/1980), by reacting potassium dititanate in the form of crystalline fibers with an aqueous solution of a bivalent metal compound (JP-A-21799/1987), by mixing an inorganic or organic compound of alkaline-earth metal and a flux (e.g., a halide of alkali metal) with an alkali metal salt of titanic acid such as potassium dititanate or potassium hexatitanate serving as a titanium source and heating the mixture (JP-A-164800/1990), or by depositing an alkaline-earth metal carbonate on the surface of a fibroustitanium dioxide compound serving as a starting material and heat-treating the resulting material (JP-A-16917/1991).

Friction materials prepared with use of an alkaline-earth metal titanate powder as the base substance, although possessing a high coefficient of friction, have the drawback of being excessive in counterpart abrasive properties.

In the course of research on improvements in processes for synthesizing the foregoing titanium compounds, we have succeeded in preparing a powder composed of particles of different titanium compounds which particles each comprise crystals of an alkaline-earth metal titanate and crystals of an alkali metal titanate by a relatively simple process using a starting material of adjusted composition, and found that the power is very useful, for example, as the base for friction materials and provides friction materials having a high coefficient of friction but diminished counterpart abrasive properties as the combined characteristics of the different titanium compounds. The present invention has been accomplished based on this finding.

SUMMARY OF THE INVENTION

The particles constituting a powder of titanium compounds of the invention are each in the form of a fine agglomerate comprising crystals of an alkaline-earth metal titanate represented by $RTiO_3$ wherein R is an alkaline-earth metal such as Ca, Ba, Sr or Mg, and crystals of an alkali metal titanate represented by $M_2Ti_nO_{2n+1}$ wherein M is an alkali metal such as Li, Na, K or Rb and n is an integer of 2 to 6, the two kinds of crystals being mingled together.

Further the particles constituting a powder of titanium compounds of the invention are each in the form of a fine agglomerate comprising crystals of an alkaline-earth metal titanate represented by $RTiO_3$ wherein R is an alkaline-earth metal, crystals of an alkali metal titanate represented by $M_2Ti_nO_{2n+1}$ wherein M is an alkali metal and n is an integer of 2 to 6, and crystals of titanium dioxide ($TiO_2$), the three kinds of crystals being mingled together.

The powders of titanium compounds of the invention are produced by preparing a mixture from RO (wherein R is an alkaline-earth metal) or an alkaline-earth metal compound becoming RO when heated, $M_2O$ (wherein M is an alkali metal) or an alkali metal compound becoming $M_2O$ when heated, and $TiO_2$ or a titanium compound becoming $TiO_2$ when heated in a ratio so that $Z \geq X+mY$ wherein Z is the number of moles of $TiO_2$, X is the number of moles of RO, Y is the number of moles of $M_2O$, Z, X and Y are each a positive number, and m is 6 when $Z>X+mY$ or m is 2 to 6 when $Z=X+mY$, and heat-treating the mixture at a temperature of 700 to 1300° C.

When the proportions of the components of the raw material are so adjusted that $Z=X+mY$ wherein m is 2 to 6, a powder composed of particles each in the form of a fine agglomerate is obtained as a heating reaction product, the agglomerates are mingled with crystals of an alkaline-earth metal titanate ($RTiO_3$) and crystals of an alkali metal titanate ($M_2Ti_nO_{2n+1}$) When the adjusted proportions are such that $Z>X+6Y$, the heating reaction affords a power composed of particles each in the form of a fine agglomerate which further comprises crystals of titanium dioxide ($TiO_2$) as mingled with the above two kinds of crystals.

The present invention further provides a friction material prepared by molding a raw material mixture containing a powder composed of particles of titanium compounds and at least a binder resin, the titanium compound particles each comprising crystals of an alkaline-earth metal titanate represented by $RTiO_3$ wherein R is an alkaline-earth metal and crystals of an alkali metal titanate represented by $M_2Ti_nO_{2n+1}$ wherein M is an alkali metal and n is an integer of 2 to 6, or these two kinds of crystals and crystals of titanium dioxide ($TiO_2$).

DETAILED DESCRIPTION OF THE INVENTION

Production of Powders of Titanium Compounds

Figure 1:
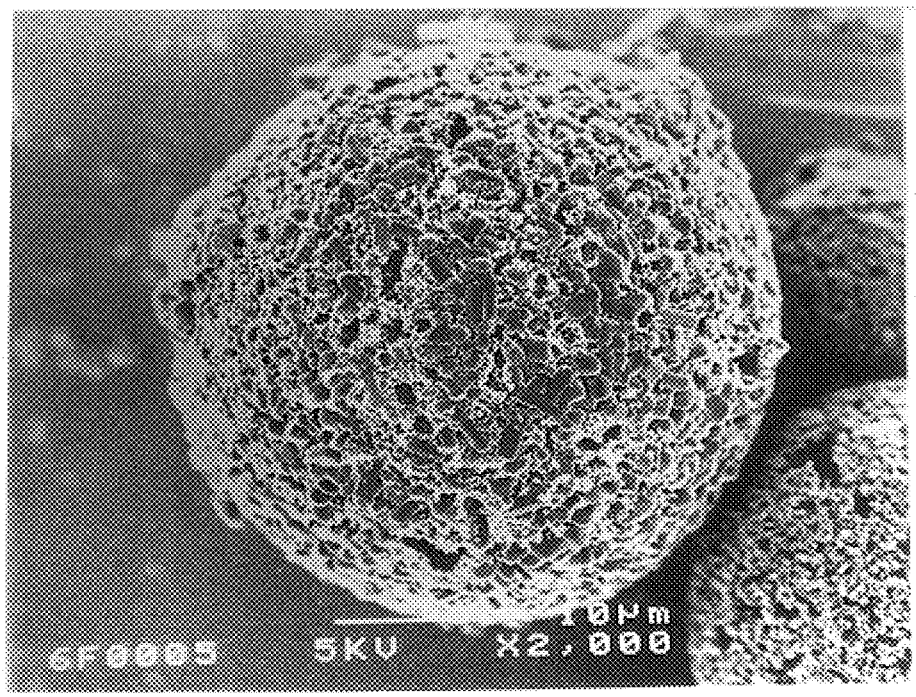
FIG. 1 is an electron photomicrograph (×2000) of a particle of titanium compounds which is in the form of a fine agglomerate comprising crystals of calcium titanate and those of potassium hexatitanate mingled therewith.

Powders of the invention which are composed of titanium compounds are produced by the process to be described below first.

The powders of the invention composed of titanium compound particles are produced from a raw material powder mixture comprising RO wherein R is an alkaline-earth metal or an alkaline-earth metal compound which becomes RO when heated, $M_2O$ wherein M is an alkali metal or an alkali metal compound which becomes $M_2O$ when heated, and $TiO_2$ or a titanate which becomes $TiO_2$ when heated, in a predetermined ratio, by heat-treating the mixture.

Usable as RO or alkaline-earth metal compounds which become RO when heated are oxides, carbonates, sulfates, nitrates, halides (e.g., chlorides and fluorides), hydroxides, etc. of Ca, Ba, Sr, Mg and the like.

Usable as $M_2O$ or alkali metal compounds which become $M_2O$ when heated are oxides, carbonates, sulfates, nitrates, halides (e.g., chlorides and fluorides), hydroxides, etc. of Li, Na, K, Rb and the like.

Usable as $TiO_2$ or titanium compounds becoming $TiO_2$ when heated are purified anatase powder, purified rutile powder and various other compounds (such as halides, sulfates, nitrates and hydrates).

The raw material powder mixture is prepared by mixing together the alkaline-earth metal compound, alkali metal compound and titanium compound in such a ratio that $Z \geq X+mY$ wherein Z is the number of moles of $TiO_2$, X is the number of moles of RO, Y is the number of moles of $M_2O$, Z, X and Y are each a positive number, and m is 6 when $Z>X+mY$ or m is 2 to 6 when $Z=X+mY$. More specicially, the proportion of the titanium compound, calculated as the number of moles, is adjusted to an amount corresponding to or greater than the sum of the amount to be consumed by the reaction with RO ($RTiO_3$ forming reaction) and the reaction with $M_2O$ ($M_2T_nO_{2n+1}$ forming reaction).

The raw material powder mixture is heat-treated in the form of a dry powder, or a slurry of such raw material mixture is spray-dried and then heat-treated, or a small amount of water and a binder are added to the raw material mixture, followed by heat treatment, or the raw material mixture is formed to a shape by a method common with ceramics as by pressing and then heat-treated.

The heat treatment is conducted by maintaining the mixture at a temperature of about 700 to 1300° C. for a suitable period of time (e.g., 0.5 to 5 hours).

In the heat treatment of the raw material powder mixture, the alkali metal compound functions as a flux on melting, and $TiO_2$ reacts with RO in the melt (alkaline-earth metal titanate ($RTiO_3$) forming reaction). Further the $M_2O$ of the mixture reacts with $TiO_2$ to form an alkali metal titanate ($M_2Ti_nO_{2n+1}$). Unlike common flux processes for preparing inorganic compounds, therefore, the flux need not be removed from the reaction mixture; the alkali metal component present in the raw material is wholly used for preparing the powder of titanium compounds without waste.

In the production process of the invention, the alkali metal compound functions as a flux, permitting formation of fine alkaline-earth metal crystals at a relatively low temperature. As these crystals separate out as highly dispersed, the crystal growth is blocked. Furtheron, the presence of the alkaline-earth metal compound or formation of the alkaline-earth metal titanate inhibits the growth of common acicular crystals of alkali metal titanate to result in formation of somewhat columnlar crystals. Consequently very fine crystals collect into particles which are in the form of fine agglomerates measuring several tens of micrometers in size. In the case where the raw material mixture is in the form of spray-dried particles of suitable sizes (for example, 10 to 100 µm) and heat-treated, the resulting particles are generally spherical in shape (see FIG. 1).

The raw material powder mixture has an optional ratio between X and Y in number of moles. The amount ratio (molar ratio) of the alkaline-earth metal titanate ($RTiO_3$) to the alkali metal titanate ($M_2Ti_nO_{2n+1}$) of the powder obtained by the heat treatment corresponds to the ratio of X to Y in number of moles, i.e., X/Y of the raw material mixture.

When the proportions of the components of the raw material mixture are so adjusted that $Z=X+mY$, the particles of the powder afforded by the heat treatment comprise two kinds of crystals, i.e. those of alkaline-earth metal titanate ($RTiO_3$) and alkali metal titanate ($M_2Ti_nO_{2n+1}$). When the adjusted proportions are such that $Z>X+6Y$, the particles of the resulting powder comprise crystals of titanium dioxide ($TiO_2$) as a third phase (in an amount (in number of moles) corresponding to $Z-(X+6Y)$), in addition to the two kinds of crystals, the three kinds of crystals being mingled together.

The heat-treating temperature is at least 700° C. since the alkaline-earth metal titanate ($RTiO_3$) forming reaction fails to occur at lower temperatures. The treating temperature is preferably at least about 800° C. The upper limit of the treating temperature should be 1300° C. in order to avoid melting of the alkali metal titanate crystals formed. Preferably, the upper limit is 1200° C.

Figure 2:
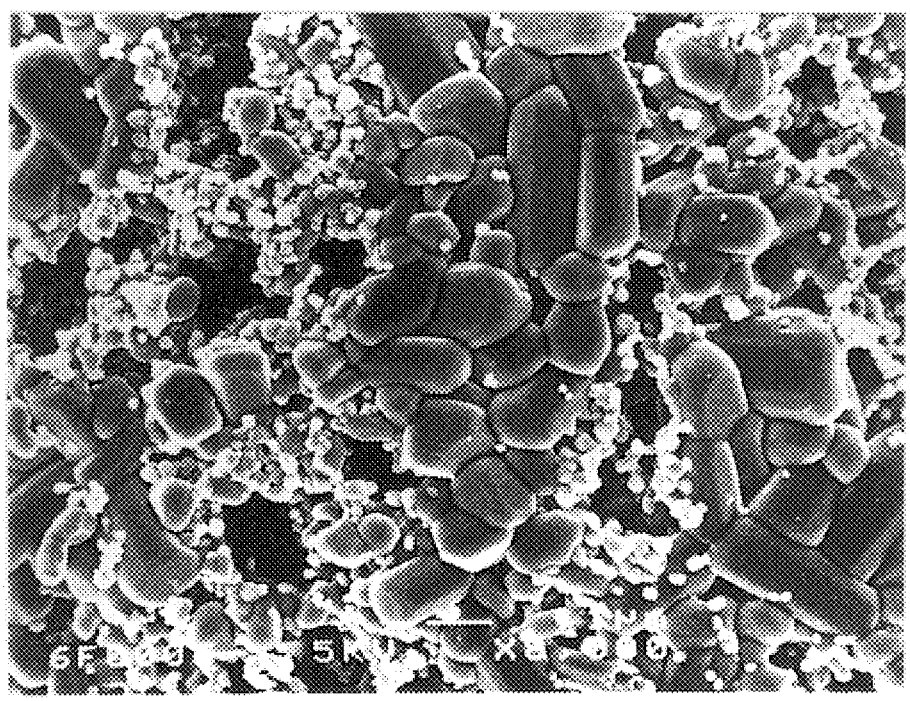
FIG. 2 is an electron photomicrograph (×8000) showing the titanium compound particle of FIG. 1 as magnified.

FIGS. 1 and 2 are electron photomicrographs of a particle of titanium compounds which is in the form of a fine agglomerate comprising, as mingled together, very fine crystals of calcium titanate (alkaline-earth metal titanate) and those of potassium hexatitanate (alkali metal titanate), the particle being formed when Z=X+6Y wherein Z, X and Y are positive numbers. In these photographs, the larger columnar crystals are potassium hexatitanate, and smaller crystals are calcium titanate.

Figure 3:
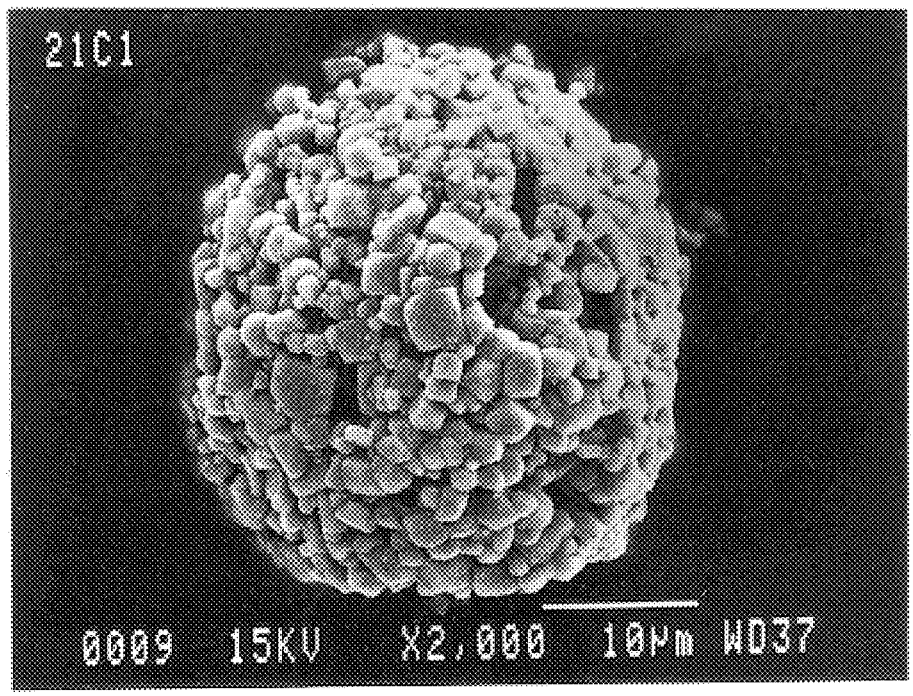
FIG. 3 is an electron photomicrograph (×2000) of a particle consisting of a single phase of calcium titanate.

For reference, FIG. 3 is an electron photomicrograph of a particle consisting of a single phase of calcium titanate and produced by the same process as that of FIG. 1 when Z=X+mY wherein Y is zero. The crystals of the particle are generally cubic. The calcium titanate has at least about ten times the crystal size of that of FIG. 1.

Figure 4:
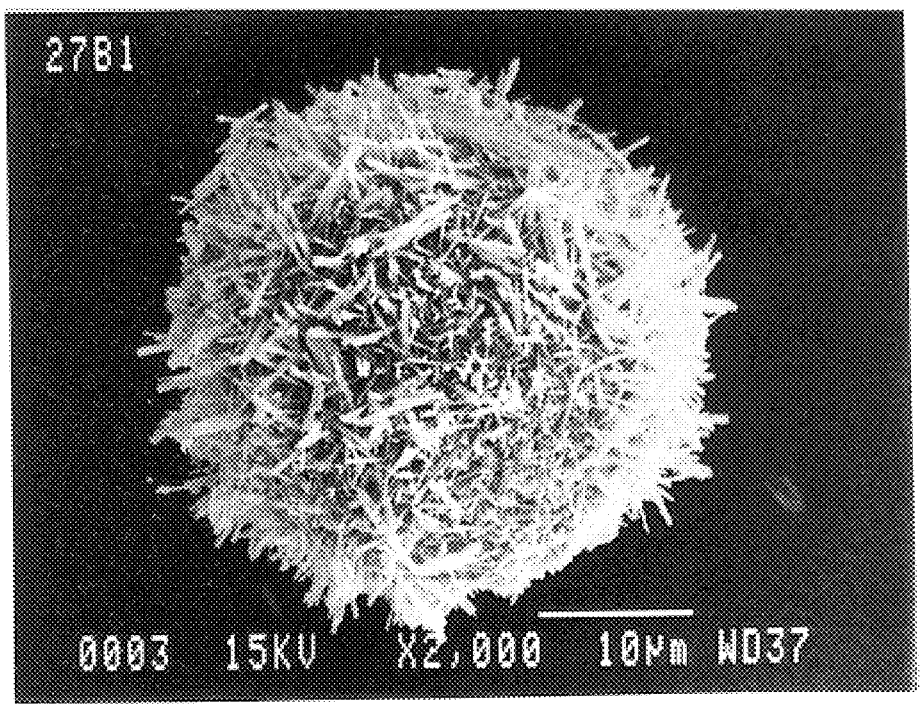
FIG. 4 is an electron photomicrograph (×2000) of a particle consisting of a single phase of potassium hexatitanate.

FIG. 4 is an electron photomicrograph of a particle consisting of a single phase of potassium hexatitanate and produced by the same process as that of FIG. 1 when Z=X+mY wherein X is zero and m is 6. The crystals of this particle, unlike those of FIG. 1, are in the form of fine acicular fibers.

Examples of Titanium Compound Powders

Next, a description will be given of specific examples of powders of titanium compounds according to the invention.

Purified anatase powder is used as $TiO_2$ or titanate. Potassium carbonate, barium carbonate, strontium carbonate or magnesium carbonate is used as an alkaline-earth metal compound.

These raw material compounds, each in the form of a powder, are suitably mixed together, and an appropriate amount of water (corresponding to twice the combined weight of the powders) is added to the mixture to prepare a slurry, which is then spray-dried into particles (about 40 $\mu$m in average size).

The dry particulate mixture is placed into an alumina crucible and heat-treated in an electric oven (heat treatment temperature;see Table 1, heat treatment time: 1 hour) to obtain a powder of titanium compounds (ranging from about 10 to about 100 $\mu$m in particle size and about 33 $\mu$m in average particle size).

Table 1 shows the proportions of the raw material compound powders and the crystal compositions of the resulting powders. Each of the raw material compounds is mentioned in its form as heated.

With No. 5, the proportions of the raw material compound powders are so adjusted that Z=X+6Y wherein Z is the number of moles of $TiO_2$, X is the number of moles of BaO and Y is the number of moles of $K_2O$. The powder obtained is composed of titanium compound particles wherein crystals of barium titanate ($BaTiO_3$) are mingled with crystals of potassium hexatitanate ($K_2Ti_6O_{13}$). The amount ratio (molar ratio) of barium titanate to potassium hexatitanate corresponds to the molar ratio (X/Y) of BaO to $K_2O$ in the raw material powder mixture.

With No. 6, the proportions of the raw material compound powders are so adjusted that Z=X+6Y wherein Z is the number of moles of $TiO_2$, X is the number of moles of SrO and Y is the number of moles of $K_2O$. The powder obtained is composed of titanium compound particles wherein crystals of strontium titanate ($SrTiO_3$) are mingled with crystals of potassium hexatitanate ($K_2Ti_6O_{12}$). The amount ratio (molar ratio) of strontium titanate to potassium hexatitanate corresponds to the molar ratio (X/Y) of SrO to $K_2O$ in the raw material powder mixture.

With No. 7, the proportions of the raw material compound powders are so adjusted that Z=X+6Y wherein Z is the number of moles of $Ti_2O$, X is the number of moles of MgO and Y is the number of moles of $K_2O$. The powder obtained is composed of titanium compound particles wherein crystals of magnesium titanate ($MgTiO_3$) are mingled with crystals of potassium hexatitanate ($K_2Ti_6O_{13}$). The amount ratio (molar ratio) of magnesium titanate to potassium hexatitanate corresponds to the molar ratio (X/Y) of MgO to $K_2O$ in the raw material powder mixture.

With No. 8, the proportions of the raw material compound powders are so adjusted that Z=X+4Y wherein Z is the number of moles of $TiO_2$, X is the number of moles of CaO and Y is the number of moles of $K_2O$. The powder obtained is composed of titanium compound particles wherein crystals of calcium titanate ($CaTiO_3$) are mingled with crystals of potassium tetratitanate ($K_2Ti_4O_9$). The amount ratio (molar ratio) of calcium titanate to potassium tetratitanate corresponds to the molar ratio (X/Y) of CaO to $K_2O$ in the raw material mixture.

With No. 9, the proportions of the raw material compound powders are so adjusted that Z=X+3Y wherein Z is the

TABLE 1

| No. | Raw Material Compounds and Molar Ratio | Crystal Phases and Molar Ratio of Product | Heat Treatment Temp. |
|---|---|---|---|
| 1 | $TiO_2:CaO:K_2O$ = 13:1:2 | $CaTiO_3:K_2Ti_6O_{13}$ = 1:2 | 1000° C. |
| 2 | $TiO_2:CaO:K_2O$ = 8:2:1 | $CaTiO_3:K_2Ti_6O_{13}$ = 2:1 | 1070° C. |
| 3 | $TiO_2:CaO:K_2O$ = 10:4:1 | $CaTiO_3:K_2Ti_6O_{13}$ = 4:1 | 1130° C. |
| 4 | $TiO_2:CaO:K_2O$ = 16:10:1 | $CaTiO_3:K_2Ti_6O_{13}$ = 10:1 | 1160° C. |
| 5 | $TiO_2:BaO:K_2O$ = 10:4:1 | $BaTiO_3:K_2Ti_6O_{13}$ = 4:1 | 1130° C. |
| 6 | $TiO_2:SrO:K_2O$ = 10:4:1 | $SrTiO_3:K_2Ti_6O_{13}$ = 4:1 | 1120° C. |
| 7 | $TiO_2:MgO:K_2O$ = 10:4:1 | $MgTiO_3:K_2Ti_6O_{13}$ = 4:1 | 1100° C. |
| 8 | $TiO_2:CaO:K_2O$ = 8:4:1 | $CaTiO_3:K_2Ti_4O_9$ = 4:1 | 1100° C. |
| 9 | $TiO_2:CaO:Na_2O$ = 7:4:1 | $CaTiO_3:Na_2Ti_3O_7$ = 4:1 | 1070° C. |
| 10 | $TiO_2:CaO:K_2O$ = 15:4:2 | $CaTiO_3:K_2Ti_6O_{13}:K_2Ti_4O_9$ = 8:3:1 | 1120° C. |
| 11 | $TiO_2:CaO:K_2O$ = 11:4:1 | $CaTiO_3:K_2Ti_6O_{13}:TiO_2$ = 4:1:1 | 1130° C. |

With No. 1 to No. 4 in Table 1, the proportions of the raw material compound powders are so adjusted that Z=X+6Y wherein Z is the number of moles of $TiO_2$, X is the number of moles of CaO and Y is the number of moles of $K_2$. The powder obtained is composed of particles of titanium compounds wherein crystals of calcium titanate ($CaTiO_3$) are mingled with crystals of potassium hexatitanate ($K_2Ti_6O_{13}$). The amount ratio (molar ratio) of calcium titanate to potassium hexatitanate corresponds to the molar ratio (X/Y) of CaO to $K_2O$ in the raw material powder mixture.

number of moles of $TiO_2$, X is the number of moles of CaO and Y is the number of moles of $Na_2O$. The powder obtained is composed of titanium compound particles wherein crystals of calcium titanate ($CaTiO_3$) are mingled with crystals of sodium trititanate ($Na_2Ti_3O_7$). The amount ratio (molar ratio) of calcium titanate to sodium trititanate corresponds to the molar ratio (X/Y) of CaO to $Na_2O$ in the raw material powder mixture.

With No. 10, the proportions of the raw material compound powders are so adjusted that Z=X+5.5Y wherein Z is the number of moles of $TiO_2$, X is the number of moles of CaO and Y is the number of moles of $K_2O$. The powder obtained is composed of titanium compound particles comprising crystals of calcium titanate ($CaTiO_3$), crystals of potassium hexatitanate ($K_2Ti_6O_{13}$) and crystals of potassium tetratitanate ($K_2Ti_4O_9$), the three kinds of crystals being mingled together. The amount ratio (molar ratio) of the $K_2Ti_6O_{13}$ of the particles to the $K_2Ti_4O_9$ thereof is 1/1. The amount ratio (molar ratio) of the $CaTiO_3$ of the particles to the combined amount of $K_2Ti_6O_{13}$ and $K_2Ti_4O_9$ corresponds to the molar ratio (X/Y) of CaO to $K_2O$ of the raw material powder mixture.

With No. 11, the proportions of the raw material compound powders are so adjusted that Z>X+6Y wherein Z is the number of moles of $TiO_2$, X is the number of moles of CaO and Y is the number of moles of $K_2O$. The powder obtained is composed of particles of titanium compounds comprising, as mingled together, crystals of calcium titanate ($CaTiO_3$), crystals of potassium hexatitanate ($K_2Ti_6O_{13}$) and crystals of titanium dioxide ($TiO_2$). The amount ratio (molar ratio) of the $CaTiO_3$ of the particles to the $K_2Ti_6O_{13}$ thereof corresponds to the molar ratio (X/Y) of CaO to $K_2O$ of the raw material powder mixture. The amount (molar ratio) of titanium oxide formed corresponds to the difference between Z and (X+6Y).

As described above titanium compound powders are available which are different in the proportions of alkaline-earth metal titanate ($RTiO_3$ wherein R is an alkaline-earth metal) and alkali metal titanate ($M_2Ti_nO_{2n+1}$ wherein M is an alkali metal), and the kind of alkali metal titanate ($M_2Ti_nO_{2n+1}$), or which differ as to whether titanium dioxide ($TiO_2$) is present, or differ in the proportion thereof, by adjusting the proportions of $TiO_2$, RO and $M_2O$ to be included in the raw material powder mixture.

Production of Friction Materials

Friction materials of the invention will be described next.

The friction materials are produced by mixing a base powder with at least a binder resin and molding the mixture. The base powder to be used is a powder composed of particles of titanium compounds comprising crystals of an alkaline-earth metal titanate represented by $RTiO_3$ wherein R is an alkaline-earth metal and crystals of an alkali metal titanate represented by $M_2Ti_nO_{2n+1}$ wherein M is an alkali metal and n is an integer of 2 to 6, or these two kinds of crystals and crystals of titanium dioxide ($TiO_2$).

The titanium compound powder to be used as the base comprises desired proportions of crystal phases. However, it is desired that the powder of the two-phase structure comprising an alkaline-earth metal titanate ($RTiO_3$) and an alkali metal titanate ($M_2Ti_nO_{2n+1}$) be (0.2 to 40)/1 in the molar ratio of $RTiO_3/M_2Ti_nO_{2n+1}$, and that the powder of the three-phase structure comprising titaniumdioxide ($TiO_2$) as mingled with the titanates be (0.2 to 40)/1/(0.1 to 20) in the molar ratio of $RTiO_3/M_2Ti_nO_{2n+1}/TiO_2$.

To be suitable, the proportion of the titanium compound powder is in the range of about 3 to about 50 wt. % based on the entire friction material. If the proportion is less than about 3 wt. %, the powder fails to exhibit the contemplated effect sufficiently, whereas if it is over about 50 wt. %, the effect to improve the friction-wear resistance levels off, and use of excessive amounts results in no benefit.

Other known materials are usable in combination with the titanium compound powder as base substances for the friction material of the invention. Examples of such other materials are polyamide (nylon) fibers, aramid fibers, acrylic fibers, steel fibers, stainless steel fibers, copper fiber, brass fiber, carbon fiber, glass fiber, alumina-silica fiber, mineral wool, wood pulp, etc. At least one kind of such amterials is selected for use as desired. These known base substances may be used in a proportion of about 10 to about 65 wt. % calculated as the combined amount of the substance and the titanium compound powder, although the proportion is not limited specifically.

To assure improvements in dispersibility and cohesion to the binder resin as required, the base substance is subjected to a surface treatment (coupling treatment) in the usual manner before use, using a silane coupling agent (such as aminosilane, vinylsilane, epoxysilane, methacryloxysilane or mercaptoxysilane) or titanate coupling agent (such as isopropyltriisostearoyl titanate or di-(dioctylpyrophosphate) ethylene titanate).

When desired to ensure improvements in friction-wear characteristics (such as coefficient of friction, wear resistance, vibration characteristics and noise), the friction material of the present invention has incorporated therein a suitable amount (e.g., 20 to 70 wt. %) of at least one known friction-wear adjusting agent selected, for example, from among organic powders such as vulcanized or unvulcanized natural or synthetic rubber powders, cashew resin particles, resin dusts and rubber dusts, inorganic powders such as natural or synthetic graphite, mica, molybdenum disulfide, antimony trisulfide, barium sulfate and calcium carbonate powders, metal powders such as copper, aluminum, zinc and iron powders, oxide powders such as alumina, silica, zircon, chromium oxide, copper oxide, antimony trioxide, titanium dioxide and iron oxide powders, etc.

Like usual friction materials, the present friction material has further incorporated therein suitable amounts (for example, up to 50 wt. %) of various additives such as corrosion inhibitor, lubricant, and abrasive according to the use and the mode of use.

Examples of binder resins are those usually used, such as phenolic resin, formaldehyde resin, epoxy resin, silicone resin and like thermosetting resins, modified (cashew oil-modified or dry-modified) thermosetting resins prepared from these resins, natural rubber, styrene-butadiene rubber, nitrile rubber and like rubber-type resins.

The mixture for producing the friction material of the invention is prepared in the same manner as conventional common friction materials except that the powder of titanium compounds is used as a base substance. No particular conditions or limitations are imposed on the production process of the friction material.

Stated more specifically, the base substance is dispersed in a binder resin, friction-wear adjusting agents, corrosion inhibitor, lubricant, abrasive, etc. are added to the dispersion when so required, and the components are uniformly mixed into a composition. The composition is preliminarily formed to a shape when required, and molded with a die or the like with heating and application of pressure (pressure: about 10 to about 40 MPa, temperature: about 150 to 200° C.). The molded body is withdrawn from the die, then heat-treated in a furnace (temperature: about 150 to 200° C., retention time: about 1 to 12 hours) when desired, and thereafter machined and ground for finishing to obtain a friction material having a predetermined shape. Another process comprises the steps of dispersing the composition in water or the like, making the composition into sheets with use of a screen, dewatering the sheets, placing a suitable number of sheets in layers, and molding the assembly with application of heat and pressure, followed by machining and grinding of the resulting molded body to obtain a specified friction material.

The alkaline-earth metal titanate $RTiO_3$ wherein R is Mg, Ca, Sr, Ba or the like is a compound having a crystal structure of the perovskite type, outstanding in strength, heat resistance and wear or abrasion resistance and possessing a suitable hardness as the base of friction materials. The friction material of the invention has a base provided by a two-phase titanium compound powder wherein crystals of the alkaline-earth metal titanate of peroviskite-type structure are mingled with crystals of an alkali metal titanate of layered or tunnel-type structure represented by $M_2Ti_nO_{2n+1}$ wherein M is an alkali metal and n is an integer of 2 to 6. Alternatively, the base of the friction material is provided by a three-phase titanium compound powder wherein crystals of titanium dioxide ($TiO_2$) are mingled with these two kinds of crystals. The friction material of the invention has an improved high coefficient of friction exceeding that of the friction material wherein an alkali metal titanate, a single-phase compound, serves as its base, and retains the high coefficient of friction over a wide temperature range.

Examples of Friction Materials

Specific examples of friction materials of the invention will be described next.

Preparation of Raw Material Composition

Table 2 shows compositions for providing friction materials. In Table 2, No. 21 to No. 24 are examples of the The composition with its components uniformly mixed together is preliminarily formed to a shape (by being held under a pressure of 14.7 MPa (=150 kg/cm$^2$) at room temperature for 1 minute) and thereafter moled with a die (pressure: 14.7 MPa=150 kg/cm$^2$, temperature: 170° C., pressure retaining time: 5 minutes). The molded body is released from the die and heat-treated in a drying oven (at 180° C. for 3 hours). The body is then cut to a predetermined size and ground, whereby a friction material sample (disk pad) is obtained.

Friction Test

The friction material sample is subjected to a friction test according to "JASO (Japan Automobile Standard Association) C 406, Passenger Vehicle Brake Device Dynamometer Test Method." The coefficient of friction and the wear of a rotor which is the counterpart are measured. Table 2 shows the result.

The coefficients of friction listed in Table 2 are data obtained by the Second Effectiveness Test under the conditions of initial speeds of braking of 50 km/h and 100 km/h and deceleration of 0.6 G.

TABLE 2

| | Composition of Friction Material (wt. %) | | | | | | | | Friction | | |
|---|---|---|---|---|---|---|---|---|---|---|---|
| | Base | | | Binder | Friction-wear Adjusting Agent | | | Lubricant | Coefficient ($\mu$) Initial Speed of Braking | | Rotor |
| No. | Ti Compound | Asbestos | Kevlar Pulp | Phenolic Resin | Cashew Dust | Copper Powder | Barium Sulfate | Graphite | 50 km/h | 100 km/h | Wear ($\mu$m) |
| 21 | [A$_1$] 22 | — | 8 | 20 | 15 | 5 | 25 | 5 | 0.38 | 0.36 | 3 |
| 22 | [A$_2$] 22 | — | 8 | 20 | 15 | 5 | 25 | 5 | 0.40 | 0.38 | 5 |
| 23 | [A$_3$] 22 | — | 8 | 20 | 15 | 5 | 25 | 5 | 0.41 | 0.39 | 9 |
| 24 | [A$_4$] 22 | — | 8 | 20 | 15 | 5 | 25 | 5 | 0.40 | 0.37 | 6 |
| 25 | [B$_1$] 22 | — | 8 | 20 | 15 | 5 | 25 | 5 | 0.35 | 0.32 | 3 |
| 26 | [B$_2$] 22 | — | 8 | 20 | 15 | 5 | 25 | 5 | 0.35 | 0.31 | 2 |
| 27 | [C] 22 | — | 8 | 20 | 15 | 5 | 25 | 5 | 0.42 | 0.43 | 21 |
| 28 | — | 22 | 8 | 20 | 15 | 5 | 25 | 5 | 0.36 | 0.36 | 29 | invention, and No. 25 to No. 28 are comparative examples. The following is represented by the symbols A$_1$ to A$_4$, B$_1$, B$_2$ and C given in the column of "Titanium compounds" and used for the base substances of No. 21 to No. 28.

A$_1$: $CaTiO_3/K_2Ti_6O_{13}=2$ moles/1 mole particle size: 10–100 μm (titanium compounds of product of No. 2 in Table 1)

A$_2$: $CaTiO_3/K_2Ti_6O_{13}=4$ moles/1 mole particle size: 10–100 μm (titanium compounds of product of No. 3 in Table 1)

A$_3$: $CaTiO_3/K_2Ti_6O_{13}=10$ moles/1 mole particle size: 10–100 μm (titanium compounds of product of No. 4 in Table 1)

A$_4$: $CaTiO_3/K_2Ti_6O_{13}/TiO_2=4$ moles/1 mole/1 mole particle size: 10–100 μm (titanium compounds of product of No. 11 in Table 1)

B$_1$: spherical particles of potassium hexatitanate ($K_2Ti_6O_{13}$) single phase particle size: 10–100 μm B$_2$: fibers of potassium hexatitanate ($K_2Ti_6O_{13}$) single phase fiber length: 150 μm (average) fiber diameter: 30 μm (average)

C: powder of calcium titanate ($CaTiO_3$) single phase particle size: 1–5 μm

Chrysotile asbestos fibers of Class 6 are used for No. 28.

Molding of Compositions

The test results given in Table 1 reveal that the friction materials (No. 21 to No. 24), examples of the invention, have a higher coefficient of friction than the friction materials (No. 25 and No. 26) wherein a base of potassium hexatitanate (alkali metal titanate) single phase is used, over the range of a relative low initial speed of braking to a high initial speed of braking involving a marked rise in the temperature of the friction face. The materials of the invention are reduced in the wear on the rotor and are therefore diminished in counterpart abrasive properties.

The friction material (No. 27) comprising a base of calcium titanate (alkaline-earth metal titanate) single phase causes marked wear to the rotor and has a problem with respect to counterpart abrasive properties though has a high coefficient of friction.

The friction material (No. 28) wherein a base of asbestos is used is inferior to those of the invention in coefficient of friction and counterpart attacking properties.

The friction materials of the invention have a high coefficient of friction and are nevertheless diminished in counterpart abrasive properties because very fine crystals of the alkaline-earth metal titanate and alkali metal titanate are uniformly dispersed in the material. This effect of uniformly dispersed fine crystals is not available by merely mixing together an alkaline-earth metal titanate powder and an alkaline metal titanate powder which are prepared by the conventional process.

The powder of titanium compounds according to the invention comprises, as mingled together, crystals of an alkaline-earth metal titanate and crystals of an alkali metal titanate, or these crystals and titania crystals as already described, and therefore has the characteristics of the respective compounds. For example, when used as a base substance for friction materials for brake devices, the powder gives the material a high coefficient of friction and diminished counterpart abrasive properties.

Further according to the invention, the powder of titanium compounds is available by a simple process wherein a raw material powder mixture is heated. In this production process, the alkali metal compound functions as a flux for an alkaline-earth metal titanate forming reaction and is also consumed as a reactant for forming the alkali metal titanate, so that unlike common flux processes for preparing inorganic compounds, the flux need not be removed from the reaction mixture. This simplifies the process, enabling the process to afford the desired product, i.e., powder of titanium compounds, in a high yield.

What is claimed is:

1. A particle of titanium compounds which is in the form of a agglomerate comprising crystals of an alkaline-earth metal titanate represented by $RTiO_3$ wherein R is an alkaline-earth metal, and crystals of an alkali metal titanate represented by $M_2Ti_nO_{2n+1}$ wherein M is an alkali metal and n is an integer from 2 to 6, the two kinds of crystals being mingled together.

2. A particle of titanium compounds according to claim 1 wherein R is an alkaline-earth metal selected from the group consisting of Ca, Ba, Sr and Mg, and M is an alkali metal selected from the group consisting of Li, Na, K and Rb.

3. A particle of titanium compounds which is in the form of a agglomerate comprising crystals of an alkaline-earth metal titanate represented by $RTiO_3$ wherein R is an alkaline-earth metal, crystals of an alkali metal titanate represented by $M_2Ti_nO_{2n+1}$ wherein M is an alkali metal and n is an integer from 2 to 6, and crystals of titanium dioxide ($TiO_2$), the three kinds of crystals being mingled together.

4. A particle of titanium compounds according to claim 3 wherein R is an alkaline-earth metal selected from the group consisting of Ca, Ba, Sr and Mg, and M is an alkali metal selected from the group consisting of Li, Na, K and Rb.

5. A particle of titanium compounds according to claim 1 which is produced by heat-treating a mixture of RO wherein R is an alkaline-earth metal or an alkaline-earth metal compound which becomes RO when heated, $M_2O$ wherein M is an alkali metal or an alkali metal compound which becomes $M_2O$ when heated, and $TiO_2$ or a titanium compound becoming $TiO_2$ when heated.

6. A particle of titanium compounds according to claim 3 which is produced by heat-treating a mixture of RO wherein R is an alkaline-earth metal or an alkaline-earth metal compound which becomes RO when heated, $M_2O$ wherein M is an alkali metal or an alkali metal compound which becomes $M_2O$ when heated, and $TiO_2$ or a titanium compound which becomes $TiO_2$ when heated.

7. A particle of titanium compounds which is obtained by a process comprising preparing a mixture from RO wherein R is an alkaline-earth metal or an alkaline-earth metal compound which becomes RO when heated; $MO_2$ wherein M is an alkali metal or an alkali metal compound which becomes $M_2O$ when heated; and $TiO_2$ or a titanium compound which becomes $TiO_2$ when heated, in a ratio such that $Z=X+mY$ wherein Z is the number of moles of $TiO_2$, X is the number of moles of RO, Y is the number of moles of $M_2O$, Z, X and Y are each a positive number, and m is 2 to 6, and heat-treating the mixture at a temperature of 700 to 1300° C., said particle being in the form of a agglomerate comprising crystals of an alkaline-earth metal titanate represented by $RTiO_3$, and crystals of an alkali metal titanate represented by $M_2Ti_nO_{2n+1}$ wherein n is an integer from 2 to 6, the two crystals being mingled together.

8. A particle of titanium compounds which is obtained by a process comprising preparing a mixture from RO wherein R is an alkaline-earth metal or an alkaline-earth metal compound which becomes RO when heated, $M_2O$ wherein M is an alkali metal or an alkali metal compound which becomes $M_2O$ when heated; and $TiO_2$ or a titanium compound which becomes $TiO_2$ when heated in a ratio so that $Z>X+6Y$ wherein Z is the number of moles of $TiO_2$, X is the number of moles of RO, Y is the number of moles of $M_2O$, Z, X and Y are each a positive number, and m is 2 to 6, and heat-treating the mixture at a temperature of 700 to 1300° C., said particle being in the form of a agglomerate comprising crystals of an alkaline-earth metal titanate represented by $RTiO_3$, and crystals of an alkali metal titanate represented by $M_2Ti_nO_{2n+1}$ wherein n is an integer from 2 to 6, and crystals of titanium dioxide, the three crystals being mingled together.

* * * * *